United States Patent
Kim et al.

(10) Patent No.: US 10,171,790 B2
(45) Date of Patent: *Jan. 1, 2019

(54) DEPTH SENSOR, IMAGE CAPTURE METHOD, AND IMAGE PROCESSING SYSTEM USING DEPTH SENSOR

(71) Applicant: SAMSUNG ELECTRONICS CO., LTD., Suwon-si, Gyeonggi-Do (KR)

(72) Inventors: Kyung Il Kim, Anyang-si (KR); Dong Wook Kwon, Suwon-si (KR); Min Ho Kim, Seongnam-si (KR); Gi Sang Lee, Suwon-si (KR); Sang Bo Lee, Yongin-si (KR); Jin Kyung Lee, Suwon-si (KR); Young Gu Jin, Osan-si (KR); Jin Wuk Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,686

(22) Filed: Mar. 3, 2017

(65) Prior Publication Data

US 2017/0180698 A1 Jun. 22, 2017

Related U.S. Application Data

(63) Continuation of application No. 14/051,605, filed on Oct. 11, 2013, now Pat. No. 9,621,868.

(30) Foreign Application Priority Data

Oct. 12, 2012 (KR) ........................ 10-2012-0113259

(51) Int. Cl.
*H04N 13/00* (2018.01)
*H04N 13/10* (2018.01)
(Continued)

(52) U.S. Cl.
CPC ............. *H04N 13/10* (2018.05); *G01S 17/08* (2013.01); *G01S 17/89* (2013.01); *H04N 13/106* (2018.05);
(Continued)

(58) Field of Classification Search
CPC ........... H04N 13/0003; H04N 13/0037; H04N 13/0253; H04N 13/0257; G01S 17/89; G01S 17/08
(Continued)

(56) References Cited

U.S. PATENT DOCUMENTS 6,115,114 A * 9/2000 Berg ...................... G01B 11/00
177/25.15
6,819,436 B2 11/2004 Ono
(Continued)

FOREIGN PATENT DOCUMENTS

CN 101750611 A 6/2010
CN 102047146 A 5/2011
(Continued)

OTHER PUBLICATIONS

Chinese office action dated Aug. 1, 2017 cited in related Chinese Patent Application No. 201310475866.3.

*Primary Examiner* — Zhihan Zhou
(74) *Attorney, Agent, or Firm* — Volentine, Whitt & Francos, PLLC

(57) ABSTRACT

An image capture method performed by a depth sensor includes; emitting a first source signal having a first amplitude towards a scene, and thereafter emitting a second source signal having a second amplitude different from the first amplitude towards the scene, capturing a first image in response to the first source signal and capturing a second image in response to the second source signal, and interpolating the first and second images to generate a final image.

17 Claims, 17 Drawing Sheets

(51) Int. Cl.
    *H04N 13/15*      (2018.01)
    *G01S 17/08*      (2006.01)
    *G01S 17/89*      (2006.01)
    *H04N 13/106*     (2018.01)
    *H04N 13/257*     (2018.01)
    *H04N 13/254*     (2018.01)
(52) U.S. Cl.
    CPC ........... *H04N 13/15* (2018.05); *H04N 13/254* (2018.05); *H04N 13/257* (2018.05)
(58) Field of Classification Search
    USPC .......................................................... 348/46
    See application file for complete search history.

(56) References Cited

U.S. PATENT DOCUMENTS

| | | | |
|---|---|---|---|
| 7,362,419 | B2 | 4/2008 | Kurihara et al. |
| 7,697,119 | B2 | 4/2010 | Ikeno et al. |
| 8,094,292 | B2 | 1/2012 | Park et al. |
| 8,139,116 | B2 | 3/2012 | Murayama |
| 8,199,222 | B2 | 6/2012 | Drimbarean et al. |
| 2008/0303919 | A1* | 12/2008 | Egawa ................. G06T 1/0007 348/223.1 |
| 2009/0116096 | A1* | 5/2009 | Zalevsky ........... G02B 27/0075 359/256 |
| 2009/0245684 | A1 | 10/2009 | Makii |
| 2010/0309201 | A1 | 12/2010 | Lim et al. |
| 2011/0051119 | A1* | 3/2011 | Min ....................... G01S 7/491 356/5.1 |
| 2012/0069176 | A1* | 3/2012 | Park ....................... G01S 17/89 348/135 |
| 2012/0134598 | A1* | 5/2012 | Ovsiannikov ........... G01S 17/89 382/217 |
| 2012/0147166 | A1 | 6/2012 | Minetoma et al. |
| 2012/0173184 | A1* | 7/2012 | Ovsiannikov ........... G01S 17/08 702/97 |
| 2012/0236121 | A1* | 9/2012 | Park ..................... H04N 13/0271 348/46 |
| 2012/0242975 | A1 | 9/2012 | Min et al. |
| 2013/0033575 | A1* | 2/2013 | Kobayashi ............. G02B 27/26 348/46 |
| 2013/0148102 | A1* | 6/2013 | Oggier ..................... G01C 3/08 356/5.01 |
| 2014/0037135 | A1* | 2/2014 | Kutliroff ................ G06F 3/017 382/103 |

FOREIGN PATENT DOCUMENTS

| | | |
|---|---|---|
| CN | 102685534 A | 9/2012 |
| JP | 2001165655 | 6/2001 |
| JP | 2010190675 | 9/2010 |
| KR | 20080095084 A | 10/2008 |
| KR | 20120105169 A | 9/2012 |
| KR | 20120108383 A | 10/2012 |

* cited by examiner

DEPTH SENSOR, IMAGE CAPTURE METHOD, AND IMAGE PROCESSING SYSTEM USING DEPTH SENSOR

CROSS-REFERENCE TO RELATED APPLICATIONS

This is a Continuation of U.S. application Ser. No. 14/051,605, filed Oct. 11, 2013, which claims priority under 35 U.S.C. § 119 to Korean Patent Application No. 10-2012-0113259 filed on Oct. 12, 2012, the subject matter of which is hereby incorporated by reference.

BACKGROUND

The inventive concept relates generally to sensors and methods of operating sensors. More particularly, the inventive concept relates to depth information calculations, depth sensors that use a time of flight (TOF) principle, image capture methods using a depth sensor, and image processing systems including a depth sensor.

A "sensor" is a device that detects the state of an object and transforms a detection result into a corresponding electrical signal. Certain sensors are also capable of communicating the corresponding electrical signal to a variety of external circuits.

Sensors include light sensors, temperature sensors, pressure sensors, magnetic sensors, and so-called depth (or distance) sensors. The term "depth sensor" is used to denote a class of sensors that detects—as one type of state—the location (or relative location) of the object. Sensors may be used to detect the state of an object in relation to a particular range of electromagnetic signals, such as microwave signals, visible light signals, infrared signals, ultrasonic signals, etc. In certain applications, a sensor will be associated with a "source" that transmits (or emits) a "source signal" or ranging signal towards an object. The object may then reflect a portion of the source signal, and the reflected portion of the source signal is detected by a depth sensor.

In this manner, a depth sensor may measure a depth (or range, or distance) between the object and the sensor using a TOF measuring method. That is, the depth sensor may be used to measures a delay time between the transmission (or emission) of the source signal and return of the reflected portion of the source signal to the sensor. In this context, an area surrounding the object, an area effectively receiving transmission of the source signal, and/or an area effectively detected by the sensor may be termed a "scene".

When a depth sensor is disposed relatively far from a scene, the level of the source signal reaching the scene and/or the level of the reflected portion of the source signal returned to the depth sensor may be relatively low. A low source signal level adversely affects the signal-to-noise ratio for the reflected portion of the source signal. That is, the depth sensor will received a relatively large quantity of noise along with the relatively weak reflected portion of the source signal.

In contrast, when the depth sensor is relatively close to a scene, the level of the reflected portion of the source signal will be relatively high, thereby providing a good signal-to-noise ratio. Unfortunately, many scenes contain some objects that are far from the depth sensor and other objects that are near the depth sensor. And it is often difficult to capture images from a complex assortment of signals reflected from both near and far objects or scene portions. Accordingly, there is a demand for methods that increase the overall accuracy of depth information provided by depth sensors, particularly as such depth information relates to scenes having multiple objects separated near and far from the depth sensor.

SUMMARY

According to an aspect of the inventive concept, there is provided an image capture method performed by a depth sensor, the method comprising emitting source signals having different amplitudes to a scene sequentially; and capturing images according to source signals sequentially reflected by the scene.

The image capture method may further comprise generating a single image by interpolating the images.

An source signal having a low amplitude from among the source signals is used to capture a point on the scene that is close to the depth sensor. An source signal having a high amplitude from among the source signals is used to capture a point on the scene that is far from the depth sensor.

According to another aspect of the inventive concept, there is provided a depth sensor comprising a light source which emits source signals having different amplitudes to a scene sequentially; a light source driver which drives the light source sequentially so that the source signals have different amplitudes; and a depth pixel which detects pixel signals having different pixel values according to source signals sequentially reflected by the scene.

The depth sensor may further comprise an image signal processor which generates images by using the pixel signals having the different pixel values.

The image signal processor may generate a single image by interpolating the images. The light source may be an infrared diode or a laser diode.

According to another aspect of the inventive concept, there is provided an image processing system comprising the depth sensor; and a processor which processes pixel signals output by the depth sensor.

The image processing system may be a portable device. The image processing system may be a smart TV, a handheld game console, or a security camera.

DETAILED DESCRIPTION

Figure 1:
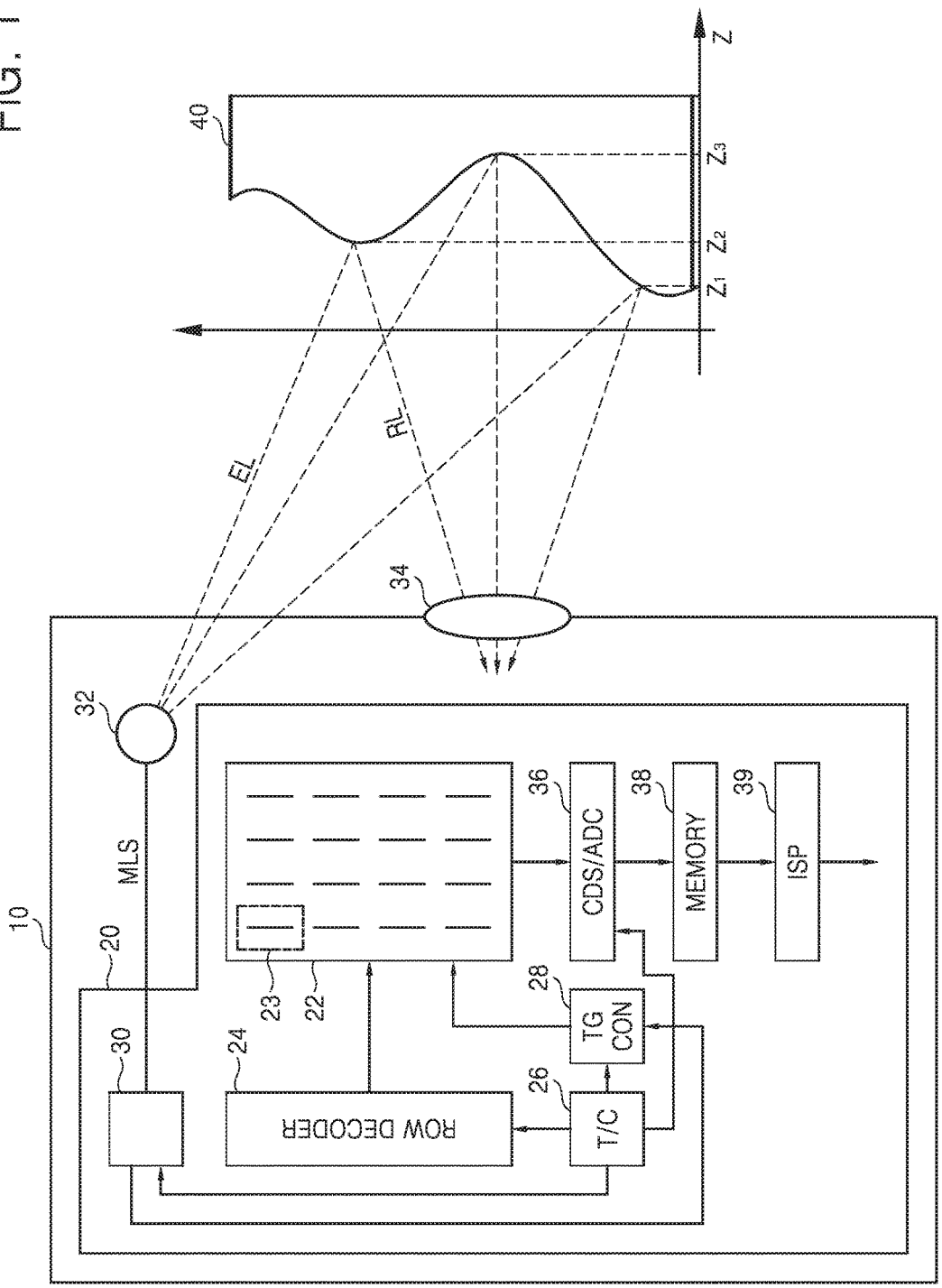
FIG. 1 is a block diagram of a depth sensor according to an embodiment of the inventive concept.
Figure 2:
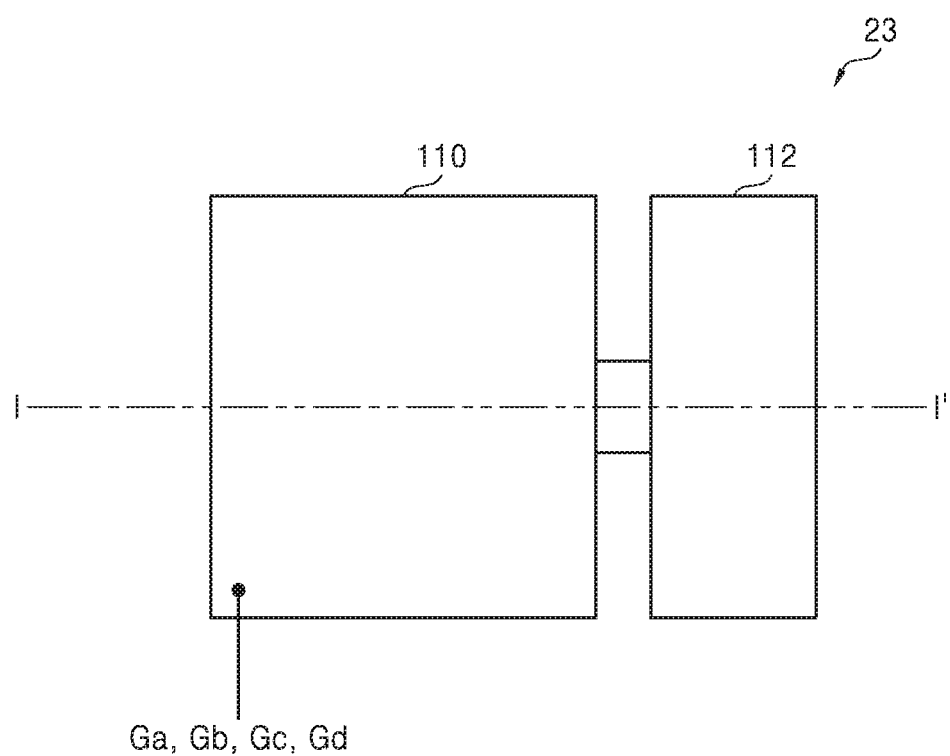
FIG. 2 is a plan view of a 1-tap depth pixel that may be included in the array of FIG. 1.
Figure 3:
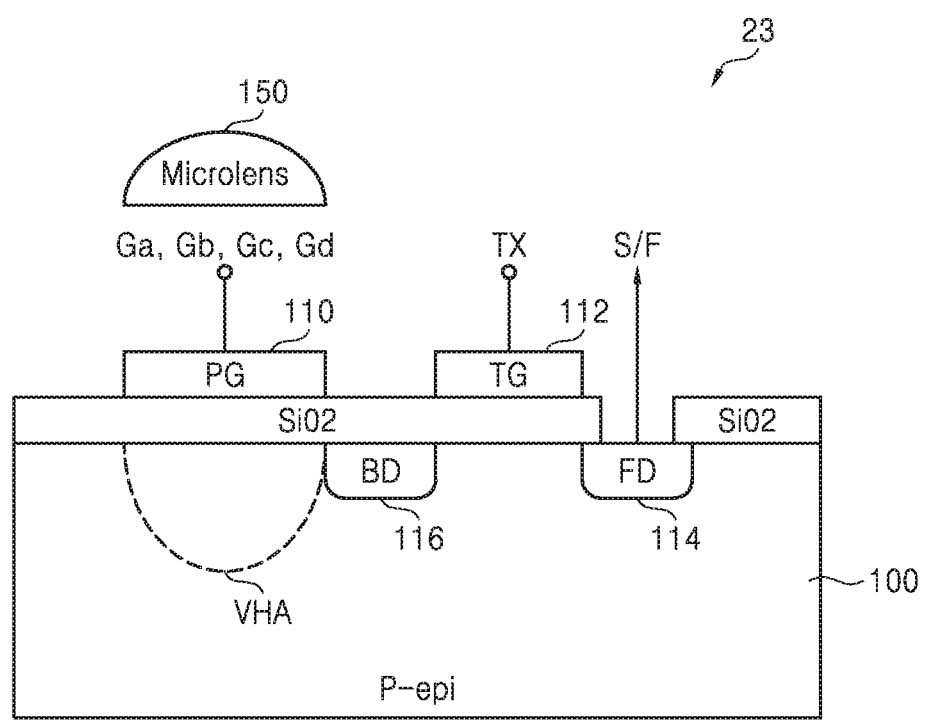
FIG. 3 is a sectional view obtained by cutting the 1-tap depth pixel of FIG. 2 along line I-I'.
Figure 4:
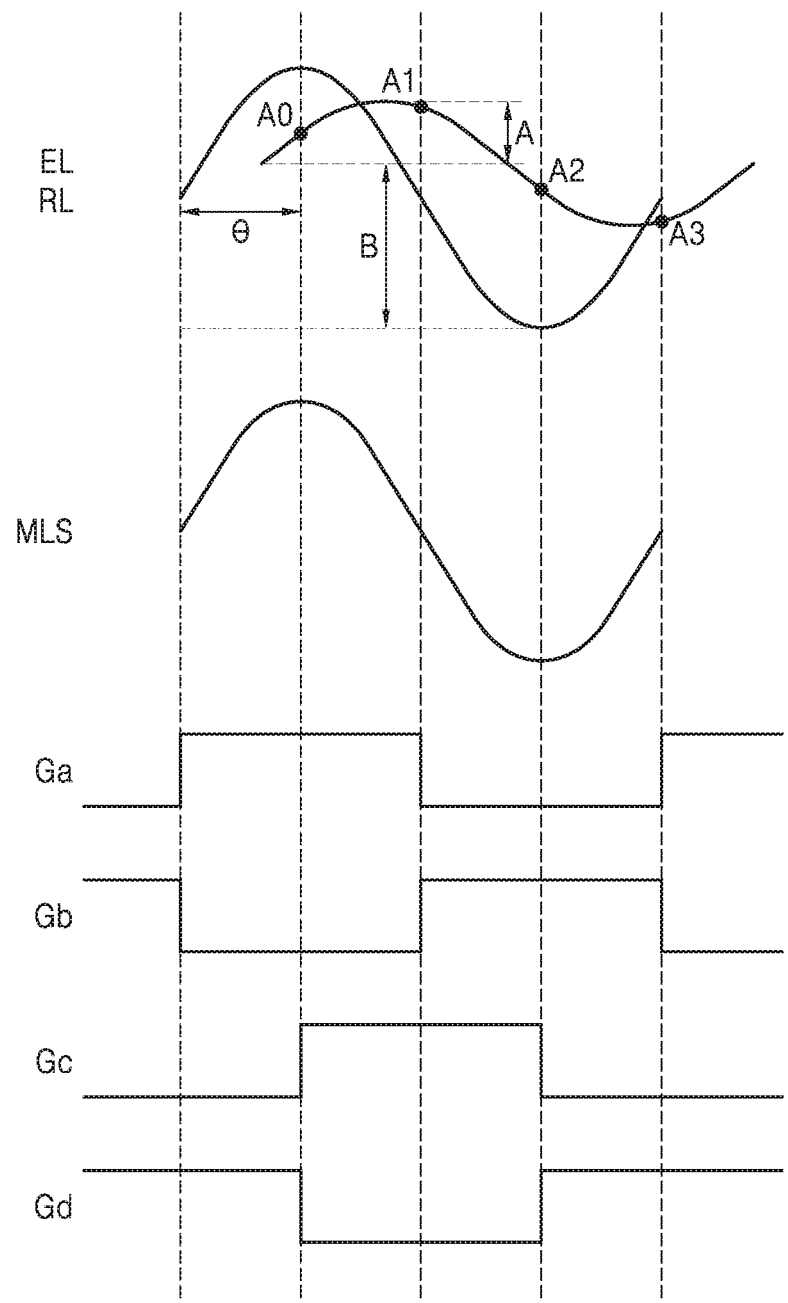
FIG. 4 is a timing diagram illustrating signals relevant to the operation of the depth sensor of FIG. 1.

As noted above, figure (FIG. 1 is a block diagram of a depth sensor 10 according to an embodiment of the inventive concept. FIG. 2 is a plan view of a 1-tap depth pixel 23 that may be included in the array 22 of FIG. 1. FIG. 3 is a sectional view obtained by cutting the 1-tap depth pixel 23 of FIG. 2 along line I-I', and FIG. 4 is a timing diagram illustrating signals relevant to the operation of the depth sensor 10 of FIG. 1.

Referring collectively to FIGS. 1, 2, 3 and 4, the depth sensor 10 is capable of measuring a distance or a depth using a time of flight (TOF) principle. Depth Sensor 10 comprises; a light source 32, a lens module 34, and a semiconductor chip 20 including the array 22. The array 22 is assumed to include a plurality of 1-tap depth pixels (detectors or sensors) 23.

The 1-tap depth pixels 23 are arranged in two-dimensional matrix to form the array 22. Each 1-tap depth pixel includes a photo gate 110 and a plurality of transistors for signal processing.

A row decoder 24 may be used to select one of a plurality of rows in response to a row address provided by a timing controller (T/C) 26. Each "row" is a particular arrangement of 1-tap depth pixels in an arbitrarily defined direction (e.g., an X-direction) within the array 22.

A photo gate controller (TG CON) 28 may be used to generate first, second, third, and fourth photo gate control signals (Ga, Gb, Gc, and Gd) and supply same to the array 22 under the control of the timing controller 26.

As shown in FIG. 4, a 90° phase difference exists between the first and third photo gate control signals (Ga and Gc), a 180° phase difference exists between the first and second photo gate control signals (Ga and Gb), and a 270° phase difference exists between the first and fourth photo gate control signals (Ga and Gd).

A light source driver 30 may be used to generate a clock signal (MLS) capable of driving the light source 32 under the control of the timing controller 26.

The light source 32 emits a modulated source signal (EL) towards a scene 40 in response to the clock signal. The scene 40 may generally include one or more target object(s). The modulated source signal may have different amplitudes according to driving of the light source driver 30. As conceptually illustrated in FIG. 1, various portions (and related object) of the scene 40 will be separated from the depth sensor 10 by different distances.

The light source 32 may be one or more of a light emitting diode (LED), an organic light emitting diode (OLED), an active-matrix organic light emitting diode (AMOLED) and a laser diode. The clock signal applied to the light source and/or the modulated source signal transmitted by the light source 32 may have a sine wave or a square wave.

The light source driver 30 supplies the clock signal and/or information derived from the clock signal to the photo gate controller 28. Accordingly, the photo gate controller 28 may be used to generate the first photo gate control signal Ga in phase with the clock signal, and the second photo gate control signal Gb having a 180° phase difference with respect to the clock signal. The photo gate controller 28 may also be used to generate the third photo gate control signal Gc having a 90° phase difference with respect to the clock signal, and the fourth photo gate control signal Gd having a 270° phase difference with respect to the clock signal. That is, in certain embodiments of the inventive concept, the photo gate controller 28 and light source driver 30 may be operated synchronously.

The photo grate 110 may be formed of transparent polysilicon. In certain embodiments of the inventive concept, the photo gate 110 may be formed of indium tin oxide, tin-doped indium oxide (ITO), indium zinc oxide (IZO), and/or zinc oxide (ZnO). The photo gate 110 may be used to transmit near infrared wavelengths received via the lens module 34.

The modulated source signal provided by the light source 32 will be reflected in various portions by object(s) in the scene 40. It is assumed for purposes of explanation that the scene 40 of FIG. 1 includes respective objects located at three (3) principle distances Z1, Z2, and Z3 from the depth sensor 10 (e.g., the light source 32 and/or array 22). In general, a distance "Z" between the depth sensor 10 and an object in the scene 40 may be calculated as follows.

Where the modulated source signal is assumed to have a waveform "cos ωt", and a reflected portion of the source signal (hereafter "reflected signal") (RL) received by the 1-tap depth pixel 23 is further assumed to be "cos(ωt+θ)", where "θ" is a phase shift or phase difference, a TOF calculation may be made using Equation 1:

$$\theta = 2*\omega*Z/C = 2*(2\pi f)*Z/C \quad \text{(Equation 1),}$$

where C is the velocity of light.

Then, the distance Z between depth sensor 10 and an object in the scene 40 may be calculated using the Equation 2:

$$Z = \theta*C/(2*\omega) = \theta*C/(2*(2\pi f)) \quad \text{(Equation 2).}$$

The reflected signal may be focused upon (or made incident to) the array 22 using the lens module 34. The lens module 34 may be variously implemented as a unit including one or more lens and one or more optical filters (e.g., an infrared pass filter).

In certain embodiments, the depth sensor 10 may include a plurality of light sources arranged in a pattern (e.g., a circle) around the lens module 34. However, the descriptive embodiments presented here assumed a single light source 32 for convenience of explanation.

The reflected signal returned to the array 22 via the lens module 34 may be demodulated by performing an N-times sampling operation (e.g., a 4 times sampling operation). In this manner, a competent sampling operation may generate (or detect) a sampled pixel signal (e.g., pixel samples A0, A1, A2, and A3 of FIG. 4) from the reflected signal. The sampled pixel signals A0, A1, A2, or A3 will be described in some additional detail hereafter.

A phase shift θ calculated by Equation 1 between the modulated source signal (EL) and the reflected signal (RL) may be expressed by Equation 3:

$$\theta = -\arctan\left(\frac{A3 - A1}{A2 - A0}\right), \quad \text{(Equation 3)}$$

where an amplitude "A" of the reflected signal (RL) may be expressed by Equation 4:

$$A = \frac{\sqrt{(A3 - A1)^2 + (A0 - A2)^2}}{2}. \quad \text{(Equation 4)}$$

Thus, an amplitude "A" of the reflected signal (RL) may be determined by the amplitude of the modulated source signal (EL) in the illustrated example of FIGS. 1 and 4.

Then, and offset "B" for the reflected signal (RL) may be expressed by Equation 5:

$$B = \frac{A0 + A1 + A2 + A3}{4}. \quad \text{(Equation 5)}$$

Referring to FIGS. 2, 3 and 4, a floating diffusion region 114 is formed within a P-type substrate 100. The floating diffusion region 114 is connected to the gate of a driving transistor S/F. The driving transistor S/F (not shown) perform the function of a source follower. The floating diffusion region 114 may be formed by a doping with N-type impurities.

A silicon oxide layer is formed on the P-type substrate 100, the photo gate 110 is formed on the silicon oxide layer, and a transfer transistor 112 is also formed on the silicon oxide layer. The P-type substrate 100 may be a P-doped epitaxial substrate.

The first photo gate control signal (Ga) is supplied to the photo gate 110 during an integration interval. This is referred to as a charge collection operation. A transfer control signal (TX) that control the transfer of photo-charge generated within a region of the P-type substrate 100 below the photo gate 110 to the floating diffusion region 114 is supplied to a gate of the transfer transistor 112. This is referred to as a charge transfer operation.

According to certain embodiments of the inventive concept, a bridging diffusion region 116 may be further formed within a region of the P-type substrate 100 between regions of the P-type substrate 100 below the photo gate 110 and the transfer transistor 112. The bridging diffusion region 116 may be doped with N-type impurities. The photo-charge is generated by source signals incident into the P-type substrate 100 via the photo gate 110.

When the transfer control signal (TX) having a "low" level (e.g., 1.0 V) is supplied to the gate of the transfer transistor 112 and the first photo gate control signal (Ga) having a "high" level (e.g., 3.3 V) is supplied to the photo gate 110, photo-charge generated within the P-type substrate 100 are concentrated in the region of the P-type substrate 100 below the photo gate 110, and this concentrated photo-charge may then be transferred to the floating diffusion region 114 (e.g., when the bridging diffusion region 116 is not formed) or to the floating diffusion region 114 via the bridging diffusion region 116 (e.g., when the bridging diffusion region 116 is formed).

FIG. 3 shows a "YHA region" in which potential or photo-charge generated when a high first photo gate control signal (Ga) is supplied to the first photo gate 110 is accumulated.

When a low transfer control signal (TX) is supplied to the gate of the transfer transistor 112 and a low first photo gate control signal (Ga) is supplied to the photo gate 110, photo-charge is generated within the region of the P-type substrate 100 below the photo gate 110, but the generated photo-charge is not transferred to the floating diffusion region 114.

A charge collection operation and a charge transfer operation performed when each of the second, third, and fourth photo gate control signals Gb, Gc, and Gd is supplied to the photo gate 110 are similar to those when the first photo gate control signal Ga is supplied to the photo gate 110.

Although the 1-tap depth pixel 23 illustrated in FIG. 3 includes a microlens 150 installed on the photo gate 110, the 1-tap depth pixel 23 may not include the microlens 150 in some cases.

The 1-tap depth pixel 23 accumulates photo-charge during a defined period of time, for example, during an integration time, and outputs corresponding pixel signals A0, A1, A2, and A3 generated according to a result of this accumulation. A pixel signal ($A_k$) generated by each of the 1-tap depth pixels 23 may be expressed by the Equation 6:

$$A_k = \sum_{n=1}^{N} a_{k,n}. \quad \text{(Equation 6)}$$

When the first photo gate control signal (Ga) is input to the photo gate 110 of the 1-tap depth pixel 23, "k" in Equation 6 has a value of "0". When the third photo gate control signal (Gc) is input to the photo gate 110 of the 1-tap depth pixel 23, "k" in Equation 6 will have a value of "1". When the second photo gate control signal (Gb) is input to the photo gate 110 of the 1-tap depth pixel 23, "k" in Equation 6 will have a value of "2", and when a phase difference of the fourth photo gate control signal (Gd) with respect to the clock signal MLS is 270°, "k" in Equation 6 will have a value of "3".

Thus, in Equation 6, the term "$a_{k,n}$" denotes a quantity of photo-charge generated by the 1-tap depth pixel 23 when an Nth gate signal is applied with a phase difference corresponding to the variable "k", and the natural number value of N is equal to (fm*Tint), where "fm" is the frequency of modulated source signal (EL) and "Tint" indicates an integration time period.

Referring to FIG. 1, under the control of the timing controller 26, a digital circuit such as (e.g.,) a correlated double sampling (CDS)/analog-to-digital converting (ADC) circuit 36 performs a CDS operation and an ADC operation with respect to the pixel signals A0, A1, A2, and A3 provided by the 1-tap depth pixel 23 in order to generate and provide output digital pixel signals. The depth sensor 10 illustrated in FIG. 1 may further include active load circuits (not shown) for transferring pixel signals output via a plurality of column lines implemented in the array 22 to the CDS/ADC circuit 36. A memory 38 may be used as a buffer that receives and stores the digital pixel signals provided by the CDS/ADC circuit 36.

According to the embodiment illustrated in FIGS. 1, 2 and 3, the depth sensor 10 may further include an image signal processor (ISP) 39. The ISP 39 may be used to calculate distance information or depth information derived from the pixel signals A0, A1, A2, and A3 stored in the memory 38.

Figure 5:
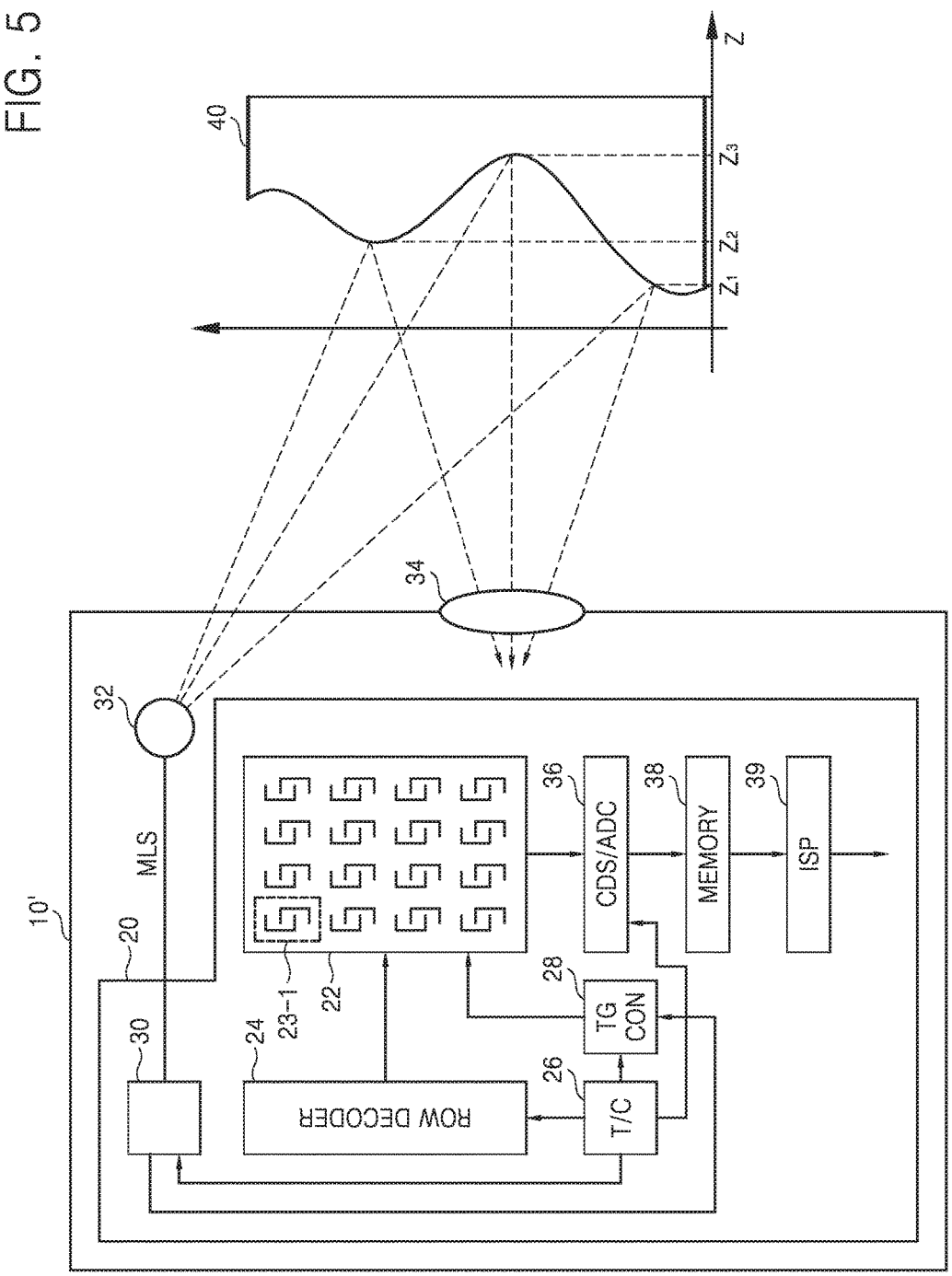
FIG. 5 is a block diagram of a depth sensor according to another embodiment of the inventive concept.
Figure 6:
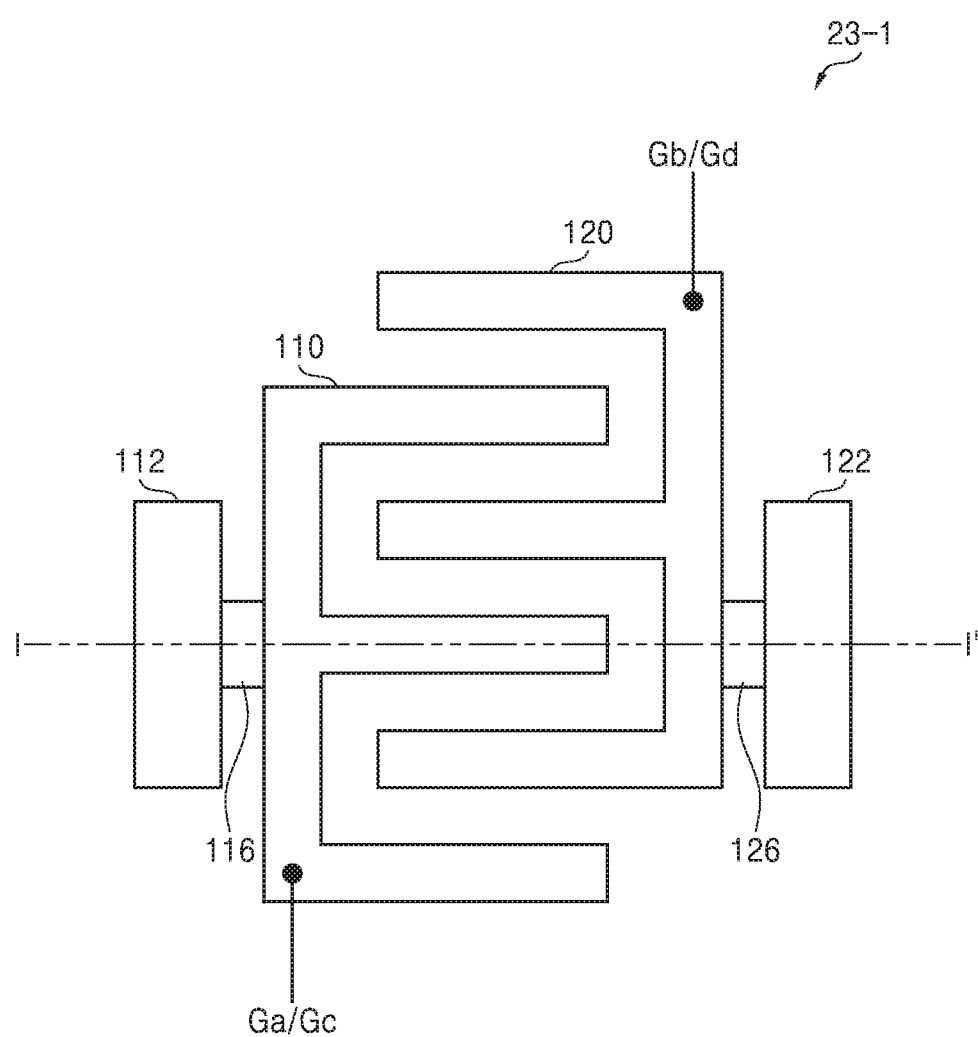
FIG. 6 is a plan view of a 2-tap depth pixel that may be included in the array of FIG. 5.
Figure 7:
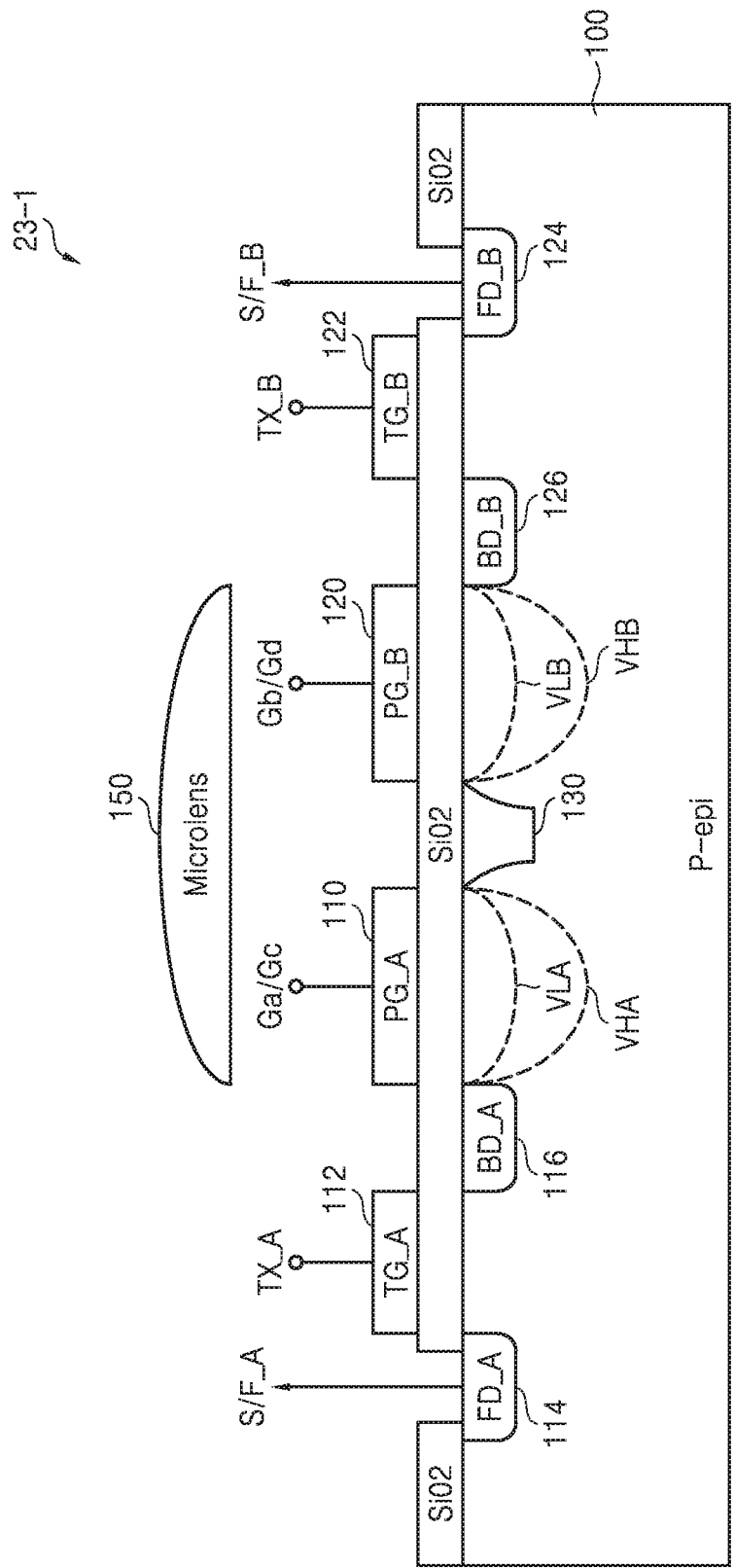
FIG. 7 is a sectional view obtained by cutting the 2-tap depth pixel of FIG. 6 along line I-I'.
Figure 8:
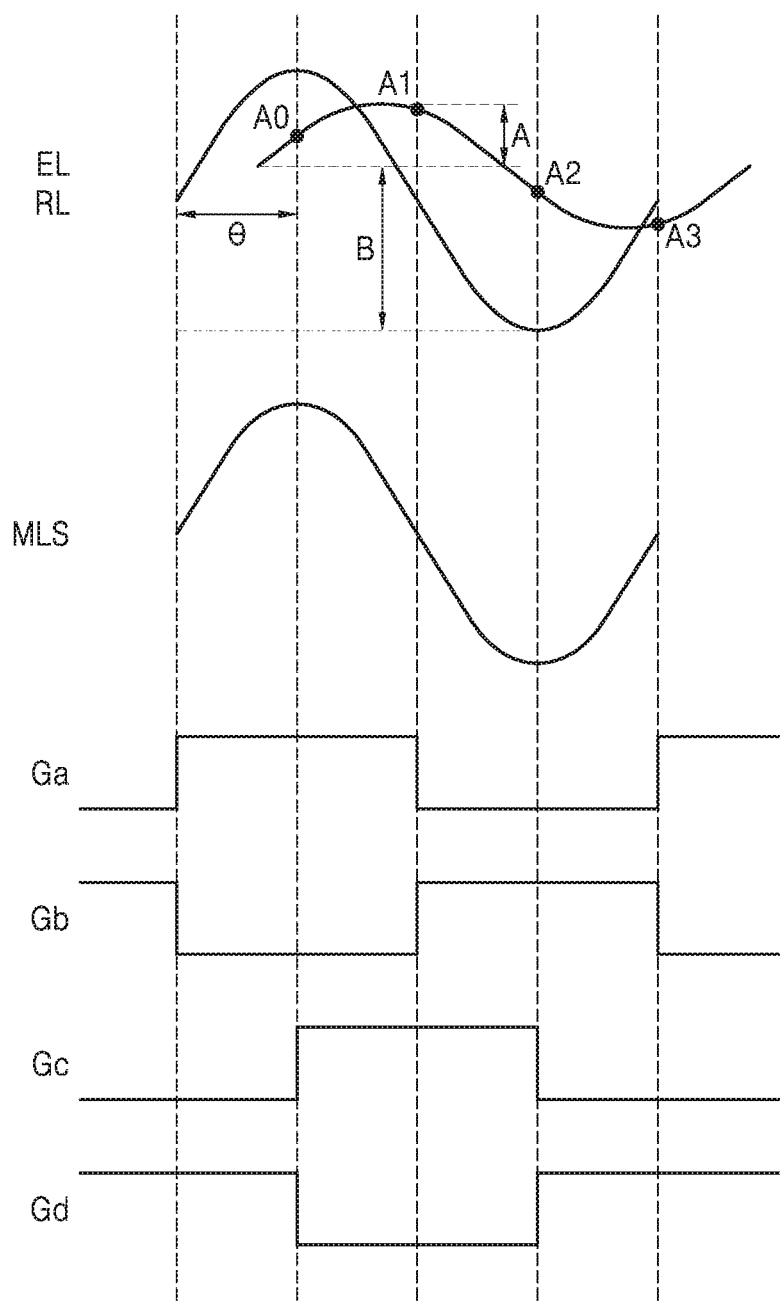
FIG. 8 is a timing diagram illustrating signals relevant to the operation of the depth sensor of FIG. 5.

FIG. 5 is a block diagram of a depth sensor 10' according to another embodiment of the inventive concept. FIG. 6 is a plan view of a 2-tap depth pixel 23-1 that may be included in the array 22 of FIG. 5. FIG. 7 is a sectional view obtained by cutting the 2-tap depth pixel 23-1 of FIG. 6 along line I-I', and FIG. 8 is a timing diagram illustrating signals relevant to the operation of the depth sensor 10' of FIG. 5.

Referring FIG. 5, the depth sensor 10' may be assumed to be structurally similar to the depth sensor 10 of FIG. 1, except for the provision of 2-tap depth pixels 23-1 in the array 22 instead of the 1-tap depth pixels 23. Thus, duplicate descriptions will be omitted.

As before, the depth sensor 23-1 of FIGS. 5, 6 and 7 is capable of measuring a distance or a depth using a TOF principle.

Each of the 2-tap depth pixels 23-1 may be implemented two-dimensionally in the array 22 includes a first photo gate 110 and a second photo gate 120. Each of the 2-tap depth pixels 23-1 also includes a plurality of transistors for signal processing.

Since the depth sensor 10' of FIG. 7 and the depth sensor 10 of FIG. 1 are different only with respect to the 2-tap depth pixels 23-1 and the 1-tap depth pixels 23, the functions and operations of components and signals indicated in FIG. 7 are the similar to analogous functions and operations previously described, unless otherwise noted.

During a first integration interval, the first photo gate control signal (Ga) is supplied to the first photo gate 110, and the second photo gate control signal (Gb) is supplied to the second photo gate 120. During a second integration interval, the third photo gate control signal (Gc) is supplied to the first photo gate 110, and the fourth photo gate control signal (Gd) is supplied to the second photo gate 120.

Referring now to FIGS. 5, 6 and 7, a first floating diffusion region 114 and a second floating diffusion region 124 are formed within a P-type substrate 100.

The first floating diffusion region 114 is connected to the gate of a first driving transistor S/F_A (not shown), and the second floating diffusion region 124 is connected to the gate of a second driving transistor S/F_B (not shown). Each of the first and second driving transistors S/F_A and S/F_B may perform the function of a source follower. Each of the first and second floating diffusion regions 114 and 124 may be doped with N-type impurities.

A silicon oxide layer is formed on the P-type substrate 100, the first and second photo gates 110 and 120 are formed on the silicon oxide layer, and first and second transfer transistors 112 and 122 are also formed on the silicon oxide layer. An isolation region 130 for preventing photo-charge generated within the P-type substrate 100 by the first photo gate 110 from interfering with photo-charge generated within the P-type substrate 100 by the second photo gate 120 may be formed within the P-type substrate 100.

The P-type substrate 100 may be a P-doped epitaxial substrate, and the isolation region 130 may be a P+-doped region. According to certain embodiments of the inventive concept, the isolation region 130 may be formed by shallow trench isolation (STI) or local oxidation of silicon (LOCOS).

During a first integration interval, the first photo gate control signal (Ga) is supplied to the first photo gate 110, and the second photo gate control signal (Gb) is supplied to the second photo gate 120. A first transfer control signal (TX_A) controlling the transfer of photo-charge generated within a region of the P-type substrate 100 below the first photo gate 110 to the first floating diffusion region 114 is supplied to the gate of the first transfer transistor 112. A second transfer control signal (TX_B) controlling the transfer of the photo-charge generated within a region of the P-type substrate 100 below the second photo gate 120 to the second floating diffusion region 124 is supplied to a gate of the second transfer transistor 122.

According to the illustrated embodiment of FIG. 7, a first bridging diffusion region 116 may be formed within a region of the P-type substrate 100 between regions of the P-type substrate 100 below the first photo gate 110 and the first transfer transistor 112. A second bridging diffusion region 126 may be formed within a region of the P-type substrate 100 between regions of the P-type substrate 100 below the second photo gate 120 and the second transfer transistor 122. Each of the first and second floating diffusion regions 116 and 126 may be doped with N-type impurities.

The photo-charge are generated by source signals incident into the P-type substrate 100 via each of the first and second photo gates 110 and 120.

When a low first transfer control signal (TX_A) is supplied to the gate of the first transfer transistor 112 and a high first photo gate control signal (Ga) is supplied to the first photo gate 110, photo-charge generated within the P-type substrate 100 are concentrated in the region of the P-type substrate 100 below the first photo gate 110, and the concentrated photo-charge are transferred to the first floating diffusion region 114 (e.g., when the first bridging diffusion region 116 is not formed) or to the first floating diffusion region 114 via the first bridging diffusion region 116 (e.g., when the first bridging diffusion region 116 is formed).

Simultaneously, when a low second transfer control signal (TX_B) is supplied to the gate of the second transfer transistor 122 and a low second photo gate control signal (Gb) is supplied to the second photo gate 120, photo-charge are generated within the region of the P-type substrate 100 below the second photo gate 120, but the generated photo-charge are not transferred to the second floating diffusion region 124. This operation is referred to as a charge collection operation.

In FIG. 7, the VHA region accumulates charge generated when a high first photo gate control signal (Ga) is supplied to the first photo gate 110, and the VLB region accumulates charge generated when a low second photo gate control signal Gb is supplied to the second photo gate 120.

When a low first transfer control signal (TX_A) is supplied to the gate of the first transfer transistor 112 and a low first photo gate control signal (Ga) is supplied to the first photo gate 110, photo-charge is generated within the region of the P-type substrate 100 below the first photo gate 110, but the generated photo-charge are not transferred to the first floating diffusion region 114.

Simultaneously, when a low second transfer control signal (TX_B) is supplied to the gate of the second transfer transistor 122 and a high second photo gate control signal (Gb) is supplied to the second photo gate 120, photo-charge generated within the P-type substrate 100 are concentrated in the region of the P-type substrate 100 below the second photo gate 120, and the concentrated charge are transferred to the second floating diffusion region 124 (e.g., when the second bridging diffusion region 126 is not formed) or to the second floating diffusion region 124 via the second bridging diffusion region 126 (e.g., when the second bridging diffusion region 126 is formed). This operation is referred to as a charge transfer operation.

In FIG. 7, the VHB region accumulates charge generated when a high second photo gate control signal (Gb) is supplied to the second photo gate 120, and the VLA region accumulates charge generated when a low first photo gate control signal (Ga) is supplied to the first photo gate 110.

A charge collection operation and a charge transfer operation performed when the third photo gate control signal (Gc) is supplied to the first photo gate 110 are similar to those performed when the first photo gate control signal (Ga) is supplied to the first photo gate 110. And a charge collection operation and a charge transfer operation performed when the fourth photo gate control signal (Gd) is supplied to the second photo gate 120 are similar to those performed when the second photo gate control signal (Gb) is supplied to the second photo gate 120.

Figure 9:
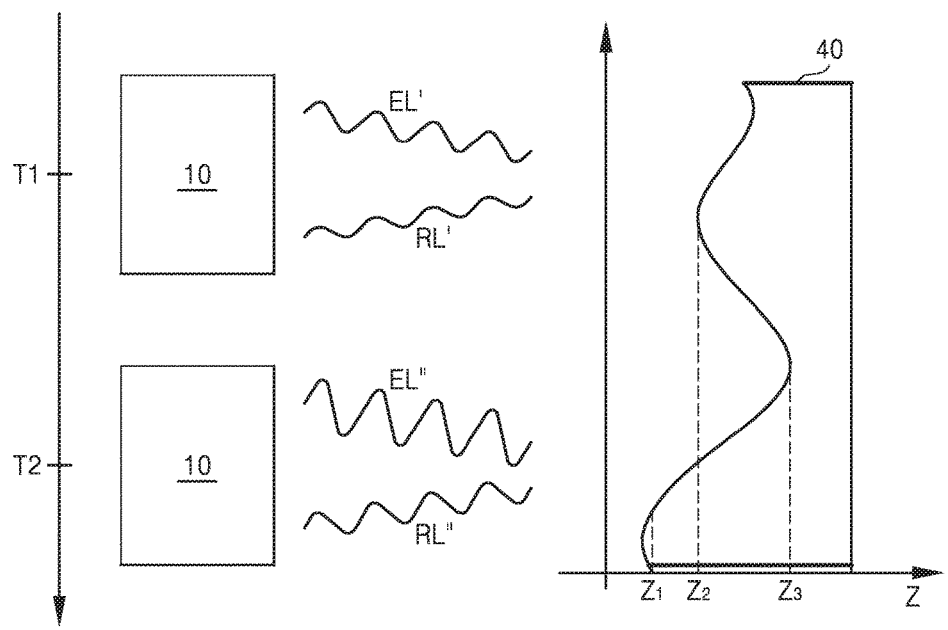
FIG. 9 is a conceptual diagram illustrating an image capture method that may be performed by a depth sensor according to an embodiment of the inventive concept.

FIG. 9 is a diagram illustrating an image capture method that may be performed by the depth sensor 10 of FIG. 1 (or analogously by the depth sensor 10' of FIG. 5).

Referring to FIGS. 1, 4, 5, 8, and 9, the depth sensor 10 emits a first modulated source signal (EL') having a first amplitude towards an object in the scene 40 in response to a clock signal at a first point in time T1. As a result, a first reflected signal RL' is returned by the object in scene 40 to the depth sensor 10. First distance (or depth) information indicating a first distance (or depth) between the depth sensor 10 and the scene 40 is generated according to a calculated first phase shift θ between the first modulated source signal EL' and the first reflected source signal RL'.

Then, the depth sensor 10 emits a second modulated source signal EL" having a second amplitude (different from the first amplitude) towards the object in the scene 40 in response to the clock signal at a second point of time T2. Accordingly, a second reflected signal RL" is returned from the object of the scene 40 to the depth sensor 10. Here, in the illustrated example of FIG. 9, the second amplitude is assumed to be greater than the first amplitude. Hence, the amplitudes of the reflected first and second source signals RL' and RL" correspond to the first and second amplitudes of the first and second modulated source signals EL' and EL", respectively. Accordingly, the second modulated source signal EL" and second reflected signal RL" result in a more intense image brightness during subsequent display of a scene image than the first modulated source signal EL' and first reflected signal RL'. In other words, amplitude corresponds to brightness in the working example, such that the greater the amplitude the more intense (or "higher") the brightness will be.

The first modulated source signal EL' having the first amplitude may be used to capture a "near point" (for example, Z1) of the scene 40 that is relatively close to the depth sensor 10. Whereas, the second modulated source signal EL" having the second amplitude may be used to capture a "distal point" (for example, Z3) of the scene 40 that is relatively far from the depth sensor 10.

The pixel signals A0, A1, A2, and A3 having different pixel values are detected by the depth pixel 23 by sequentially emitting the first and second source signals EL' and EL" having different amplitudes towards the scene 40. For example, pixel signals A0, A1, A2, and A3 each having a first pixel value are detected by performing a sampling operation on the first reflected signal RL' four times, and pixel signals A0, A1, A2, and A3 each having a second pixel value are detected by performing a sampling operation on the second reflected signal RL" four times.

The first pixel value of the first pixel signal A0 detected by the first reflected signal RL' may be different from the second pixel value of the first pixel signal A0 detected by the second reflected signal RL". Thus, the ISP 39 generates a "first image" using the pixel signals A0, A1, A2, and A3 each having the first pixel value, and generates a "second image" using the pixel signals A0, A1, A2, and A3 each having the second pixel value. The first image is generated in accordance with the first source signal EL' having the first amplitude, whereas the second image is generated in accordance with the second source signal EL" having the second amplitude. A first point (or first object) in the first image that is relatively far from the depth sensor 10 may be distorted (or defocused) by noise for example, whereas a second point (or second object) in the second image that is relatively close to the depth sensor 10 may be distorted (or defocused) by noise for example. Accordingly, the ISP 39 generates both first and second images, and then interpolates the first and second images to generate a final image. The final image is characterized by significantly improve quality over either one of the first and second images. In other words, the accuracy of distance information used to generate the final image is improved.

Figure 10:
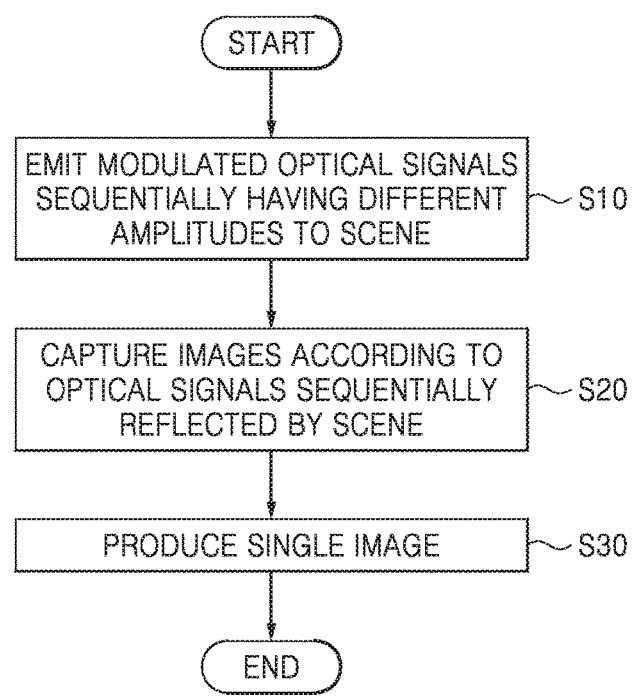
FIG. 10 is a flowchart summarizing one possible image capture method that may be performed by a depth sensor according to an embodiment of the inventive concept.

FIG. 10 is a flowchart of an image capture method performed by a depth sensor according to the inventive concept.

Referring to FIGS. 1, 4, 5, 8, 9, and 10, the light source 32 sequentially emits the first and second modulated source signals EL' and EL", each having a different amplitude towards the scene 40 (S10). The light source drive 30 may drive the light source 32 to sequentially emit the first and second modulated source signals EL' and EL".

Then, the ISP 39 may be used to capture first and second images respectively corresponding to the first and second reflected signals RL' and RL" returned from the scene 40 (S20). That is, the depth pixel 23 detects first and second pixel signals having different pixel values in accordance with the first and second reflected signals RL' and RL". The ISP 39 captures the first and second images using the first and second pixel signals.

Then, the ISP 39 may be used to generate a single (final) image by interpolating the first and second images (S30).

Figure 11:
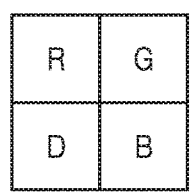
FIG. 11 illustrates one possible example of a unit pixel array for a three-dimensional (3D) image sensor that may be used in certain embodiments of the inventive concept.

FIG. 11 illustrates a unit pixel array 522-1 of a three-dimensional (3D) image sensor, according to an example. Referring to FIG. 11, the unit pixel array 522-1 constitutes is a part of a pixel array 522 of FIG. 13 and may include a red pixel R, a green pixel G, a blue pixel B, and a depth pixel D. The depth pixel D may be the depth pixel 23 having a 1-tap pixel structure as illustrated in FIG. 1 or the depth pixel 23-1 having a 2-tap pixel structure as illustrated in FIG. 5. The red pixel R, the green pixel G, and the blue pixel B may be referred to as RGB color pixels.

The red pixel R generates a red pixel signal corresponding to the wavelengths belonging to a red region of a visible light region, the green pixel G generates a green pixel signal corresponding to the wavelengths belonging to a green region of the visible light region, and the blue pixel B generates a blue pixel signal corresponding to the wavelengths belonging to a blue region of the visible light region. The depth pixel D generates a depth pixel signal corresponding to the wavelengths belonging to an infrared region.

Figure 12:
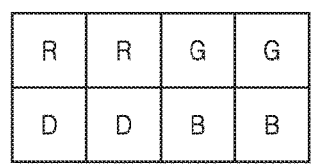
FIG. 12 illustrates another possible example of a unit pixel array for a 3D image sensor that may be used in certain embodiments of the inventive concept.

FIG. 12 illustrates a unit pixel array 522-2 of the 3D image sensor, according to another example. Referring to FIG. 12, the unit pixel array 522-2 constitutes a part of the pixel array 522 of FIG. 13 and may include two red pixels R, two green pixels G, two blue pixels B, and two depth pixels D.

The unit pixel arrays 522-1 and 522-2 of FIGS. 11 and 12 are illustrated by way of example recognizing that a pattern of a particular unit pixel array and pixels that constitute the pattern may vary according to embodiment. For example, the red, green, and blue pixels R, G, and B of FIG. 12 may be replaced by magenta pixels, cyan pixels, and yellow pixels, respectively. A color pixel array including the red, green, and blue pixels R, G, and B may be separated from an array including the depth pixels D.

Figure 13:
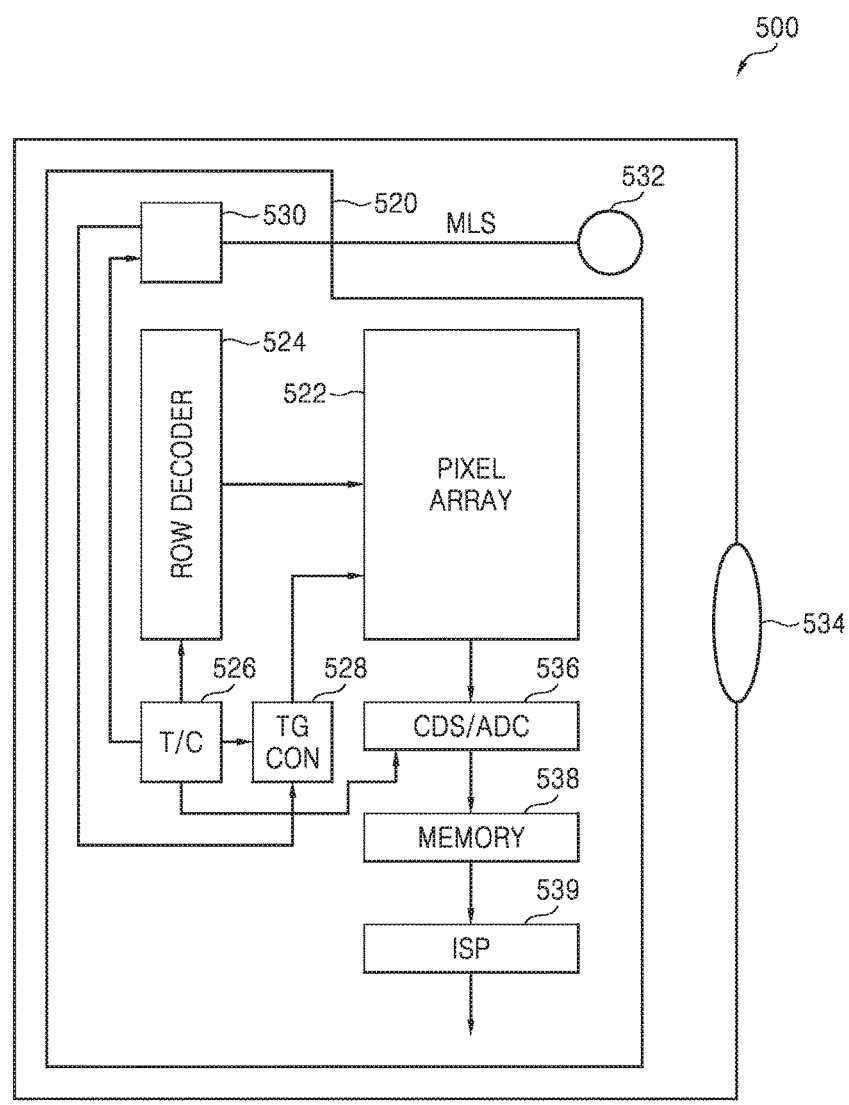
FIG. 13 is a block diagram of a 3D image sensor according to an embodiment of the inventive concept.

FIG. 13 is a block diagram of a three-dimensional (3D) image sensor 500 according to an embodiment of the inventive concept. The 3D image sensor 500 denotes a device capable of obtaining 3D image information by combining a function of measuring depth information by using the depth pixel D included in the unit pixel array 522-1 or 522-2 of FIG. 11 or 12 with a function of measuring each color information (for example, red color information, green color information, or blue color information) by using the red, green, and blue pixels R, G, and B included in the unit pixel array 522-1 or 522-2.

Referring to FIG. 13, the 3D image sensor 500 comprises a semiconductor chip 520, a light source 532, and a lens module 534. The semiconductor chip 520 includes the pixel array 522, a row decoder 524, a timing controller 526, a photo gate controller 528, a light source driver 530, a CDS/ADC circuit 536, a memory 538, and an ISP 539.

The operations and functions of the row decoder 524, the timing controller 526, the photo gate controller 528, the light source driver 530, the CDS/ADC circuit 536, the memory 538, and the ISP 539 of FIG. 13 are the same as those of the row decoder 24, the timing controller 26, the photo gate controller 28, the light source driver 30, the light source 32, the CDS/ADC circuit 36, the memory 38, and the ISP 39 of FIG. 1, respectively, so a detailed description thereof will be omitted unless otherwise particularly stated.

According to an embodiment, the 3D image sensor 500 may further include a column decoder (not shown). The column decoder may decode column addresses output by the timing controller 526 to output column selection signals.

The row decoder 524 may generate control signals for controlling an operation of each pixel included in the pixel array 522, for example, operations of the pixels R, G, B, and D of FIG. 11 or 12.

The pixel array 522 includes the unit pixel array 522-1 or 522-2 of FIG. 11 or 12. For example, the pixel array 522 includes a plurality of pixels. The pixels may be a mixture of at least two of a red pixel, a green pixel, a blue pixel, a depth pixel, a magenta pixel, a cyan pixel, and a yellow pixel. The pixels may be arranged on intersections of a plurality row lines and a plurality of column lines in a matrix shape. According to an embodiment, the 3D image sensor 500 may not include the ISP 539.

Figure 14:
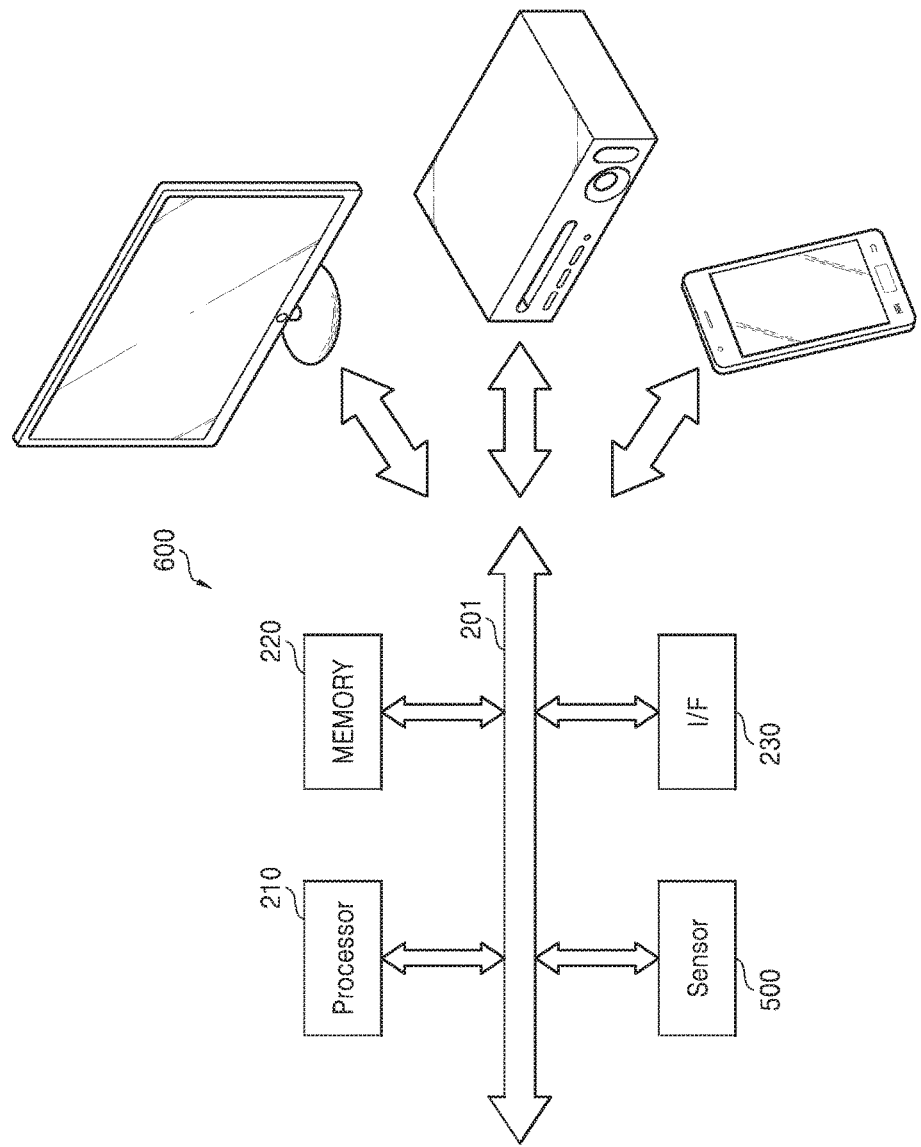
FIG. 14 is a block diagram of an image processing system that may include the 3D image sensor of FIG. 13.

FIG. 14 is a block diagram of an image processing system 600 that may incorporate the 3D image sensor 500 of FIG. 13. Referring to FIG. 14, the image processing system 600 may include the 3D image sensor 500 and a processor 210.

The processor 210 may control an operation of the 3D image sensor 500. For example, the processor 210 may store a program for controlling the operation of the 3D image sensor 500. According to an embodiment, the processor 210 may access a memory (not shown) in which the program for controlling the operation of the 3D image sensor 500 is stored, in order to execute the program stored in the memory.

The 3D image sensor 500 may generate 3D image information based on each digital pixel signal (for example, color information or depth information), under the control of the processor 210. The 3D image information may be displayed on a display (not shown) connected to an interface (I/F) 230. The 3D image information generated by the 3D image sensor 500 may be stored in a memory 220 via a bus 201 under the control of the processor 210. The memory 220 may be implemented by using a non-volatile memory.

The I/F 230 may be implemented by using an interface for receiving and outputting 3D image information. According to an embodiment, the I/F 230 may be implemented by using a wireless interface.

Figure 15:
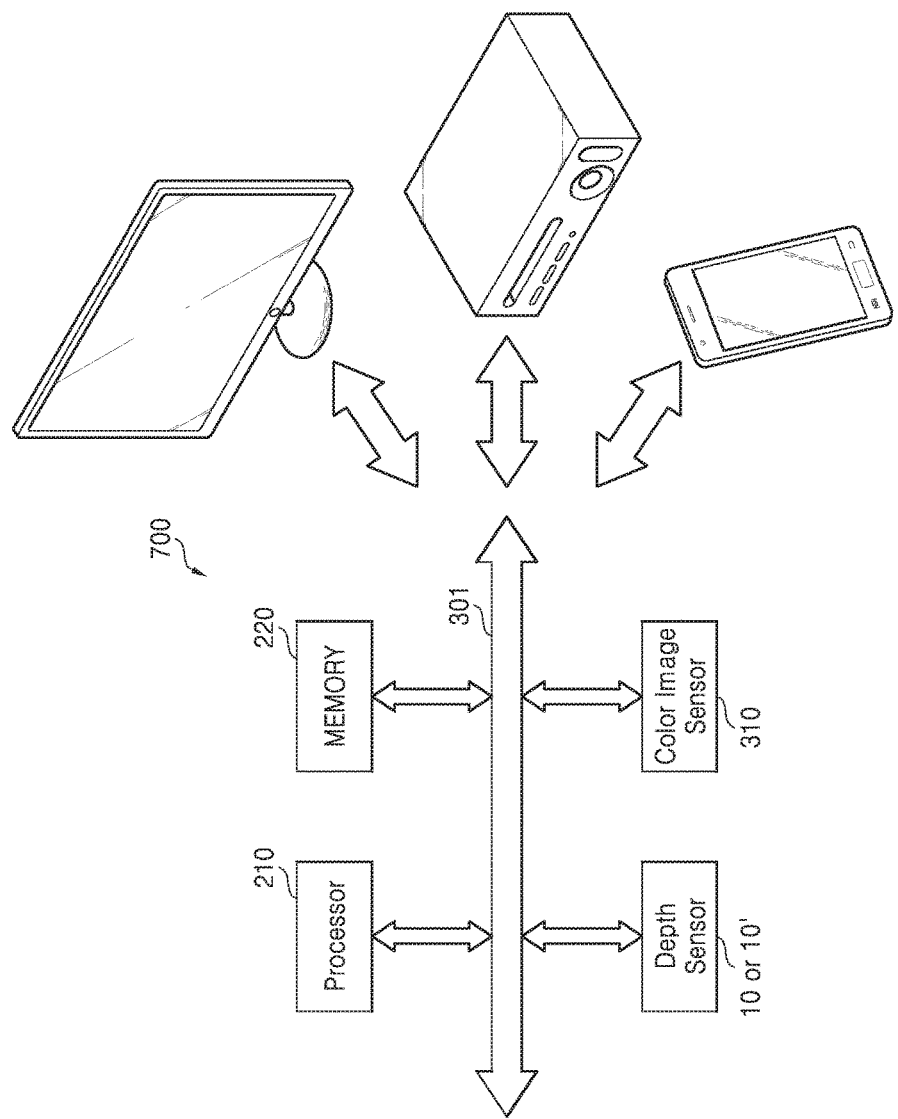
FIG. 15 is a block diagram of an image processing system that may include a color image sensor and a depth sensor according to an embodiment of the inventive concept.

FIG. 15 is a block diagram of an image processing system 700 that may incorporate the depth sensor 10 of FIG. 1 or the depth sensor 10' of FIG. 5, or the color image sensor 310. Referring to FIG. 15, the image processing system 700 may include the depth sensor 10 or 10', the color image sensor 310, which includes RGB color pixels, and a processor 210.

Although the depth sensor 10 or 10' is physically separated from the color image sensor 310 in FIG. 15 for convenience of explanation, the depth sensor 10 or 10' and the color image sensor 310 may include physically-overlapping signal processing circuits.

The color image sensor 310 may denote an image sensor that includes no depth pixels and includes a pixel array including a red pixel, a green pixel, and a blue pixel. Accordingly, the processor 210 may generate 3D image information based on depth information predicted (or calculated) by the depth sensor 10 or 10' and each color information (for example, at least one of red information, green information, blue information, magenta information, cyan information, or yellow information) output by the color image sensor 310, and may display the 3D image information on a display. The 3D image information generated by the processor 210 may be stored in a memory 220 via a bus 301.

Figure 16:
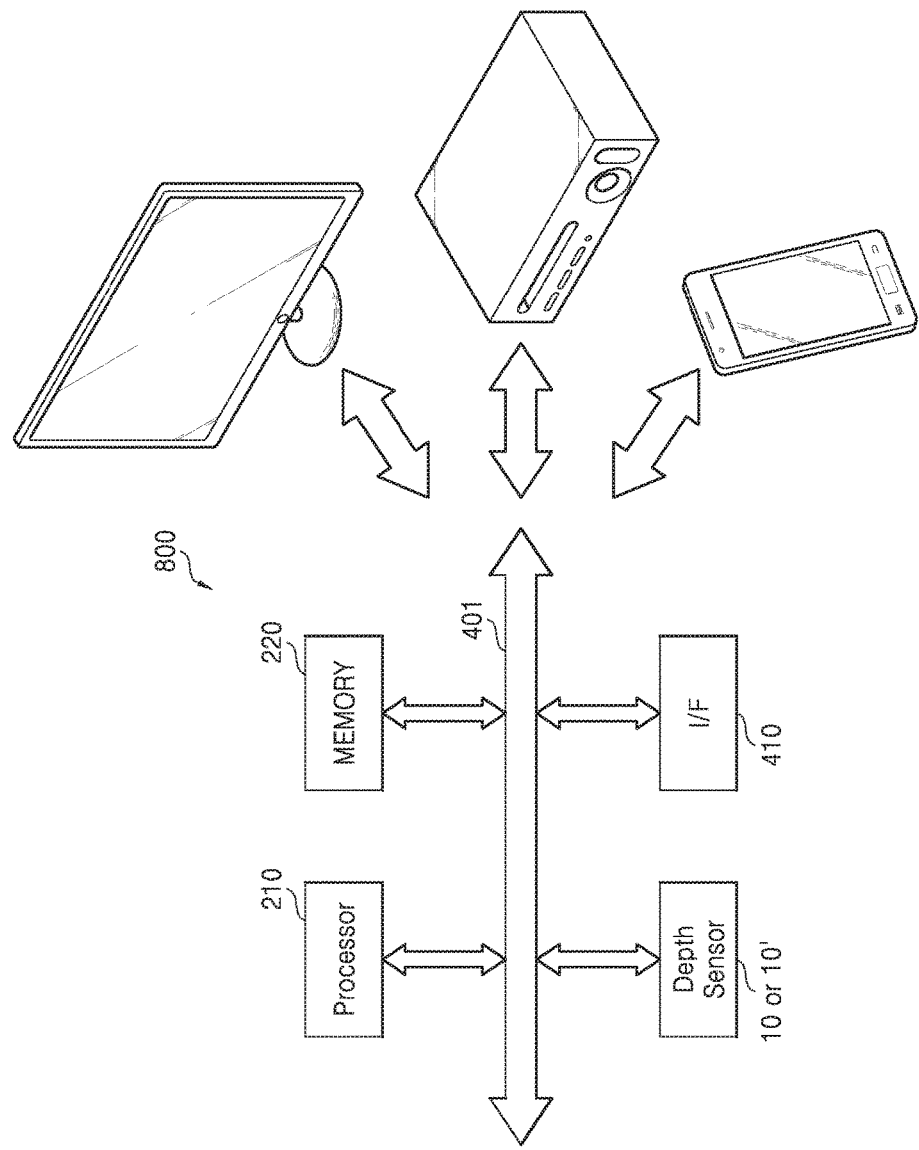
FIG. 16 is a block diagram of an image processing system.

FIG. 16 is a block diagram of an image processing system 800 that may incorporate the depth sensor 10 of FIG. 1 or the depth sensor 10' of FIG. 5. Referring to FIG. 16, the signal processing system 800 is capable of serving only as a simple depth (or distance) measuring sensor and includes the depth sensor 10 or 10' and a processor 210 for controlling an operation of the depth sensor 10 or 10'.

The processor 210 may calculate distance information or depth information respectively representing a distance or a depth between the signal processing system 800 and a subject (or a target object), based on pixel signals output by the depth sensor 10 or 10'. In this case, the depth sensor 10 or 10' may not include the ISP 39. The distance information or the depth information measured by the processor 210 may be stored in a memory 220 via a bus 401.

An I/F 410 may be implemented for receiving and outputting depth information. According to an embodiment, the I/F 410 may be implemented by using a wireless interface.

The image processing system 600, 700, or 800 of FIG. 14, 15 or 16 may be used in a 3D distance measurer, a game controller, a depth camera, a portable apparatus, or a gesture sensing apparatus. According to an embodiment, the image processing system 600, 700, or 800 of FIG. 14, 15 or 16 may be implemented by using a mobile phone, a smart phone, a tablet PC, a personal digital assistant (PDA), an enterprise digital assistant (EDA), a digital still camera, a digital video camera, a portable multimedia player (PMP), a personal (or portable) navigation device (PND), a smart TV, a handheld game console, a security camera, or an e-book.

Figure 17:
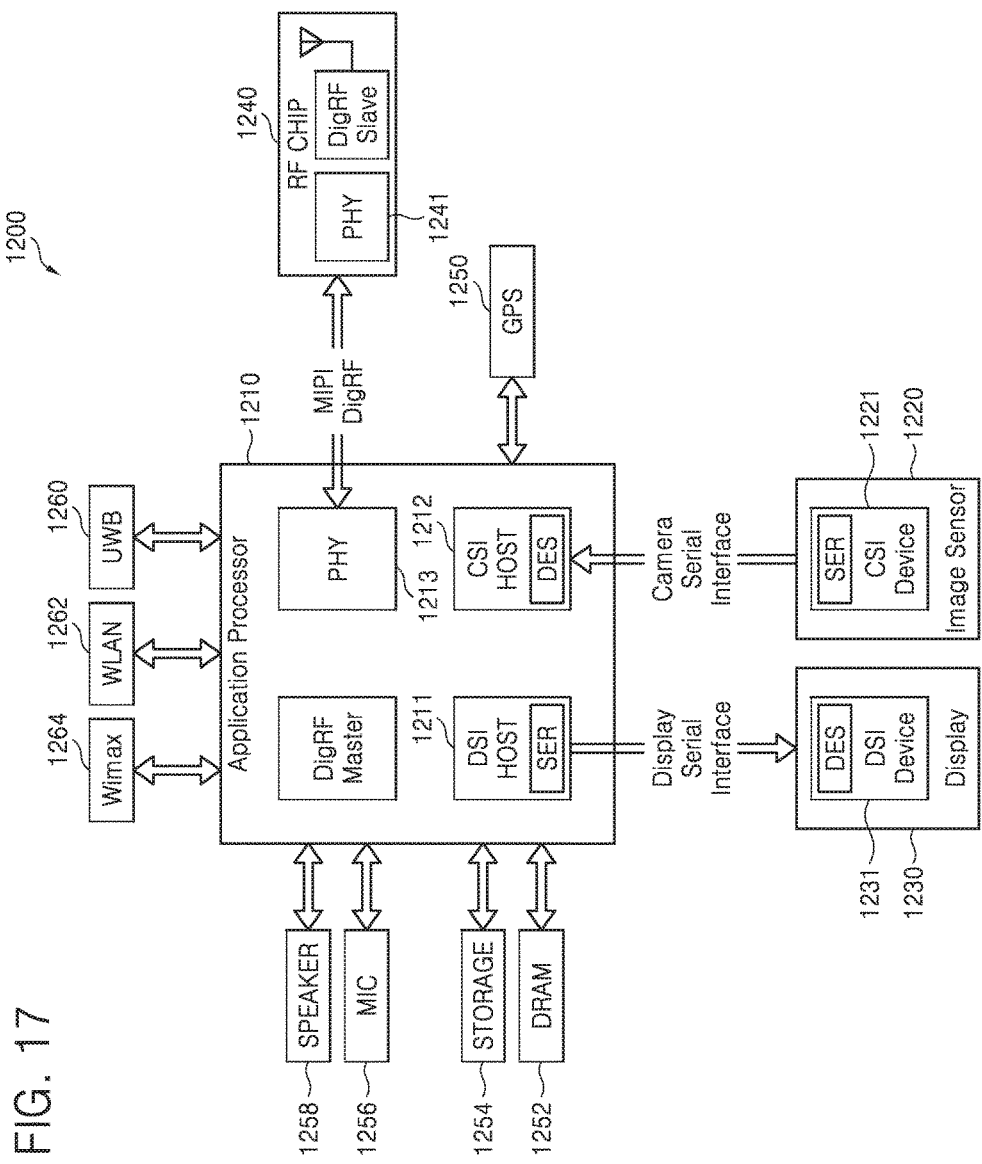
FIG. 17 is a block diagram of an image processing system that may include a depth sensor according to an embodiment of the inventive concept.

FIG. 17 is a block diagram of an image processing system 1200 that may incorporate a depth sensor according to an embodiment of the inventive concept. Referring to FIG. 17, the image processing system 1200 may be implemented using a data processing device capable of using or supporting a mobile industry processor interface (MIPI®) interface, for example, a portable device such as a PDA, a PMP, a mobile phone, a smart phone, or a tablet PC.

The image processing system 1200 includes an application processor 1210, an image sensor 1220, and a display 1230.

A camera serial interface (CSI) host 1212 implemented in the application processor 1210 may serially communicate with a CSI device 1221 of the image sensor 1220 via a CSI. According to an embodiment, a deserializer DES may be implemented in the CSI host 1212, and a serializer SER may be implemented in the CSI device 1221. The image sensor 1220 may be the depth sensor 10 of FIG. 1, or the depth sensor 10' of FIG. 5.

A display serial interface (DSI) host 1211 implemented in the application processor 1210 may serially communicate with a DSI device 1231 of the display 1230 via a DSI. According to an embodiment, a serializer SER may be implemented in the DSI host 1211, and a deserializer DES may be implemented in the DSI device 1231.

The image processing system 1200 may further include a radio frequency (RF) chip 1240 capable of communicating with the application processor 1210. A PHY (physical layer) 1213 of the application processor 1210 and a PHY 1241 of the RF chip 1240 may transmit and receive data to and from each other via MIPI DigRF.

The image processing system 1200 may further include a global positioning system (GPS) 1250, a memory 1252 such as a dynamic random access memory (DRAM), a data storage device 1254 implemented by using a non-volatile memory such as a NAND flash memory, a microphone (MIC) 1256, or a speaker 1258.

The image processing system 1200 may communicate with an external apparatus by using at least one communication protocol (or a communication standard), for example, a ultra-wideband (UWB) 1260, a wireless local area network (WLAN) 1262, worldwide interoperability for microwave access (WiMAX) 1264, or a long term evolution (LTE™) (not shown).

In a depth sensor according to an embodiment of the present inventive concept, and an image capture method performed by the depth sensor, multiple source signals having respectively different amplitudes may be sequentially emitted towards a scene and advantageously used to increase the accuracy of distance information in a final image of the scene.

While the inventive concept has been particularly shown and described with reference to exemplary embodiments thereof, it will be understood that various changes in form and details may be made therein without departing from the scope of the following claims.

What is claimed is:

1. An image capture method performed by a depth sensor, the method comprising:
   emitting a first source signal having a first amplitude towards a scene, and thereafter, emitting a second source signal having a second amplitude different from the first amplitude towards the scene;
   receiving, as a first reflected signal, a reflected portion of the first source signal;
   receiving, as a second reflected signal, a reflected portion of the seconds source signal;
   demodulating the first reflected signal with an N-times sampling operation to generate a first image;
   demodulating the second reflected signal with another N-times sampling operation to generate a second image, wherein N is an integer greater than one; and
   interpolating the first and second images to generate a final image, wherein:
   the second amplitude is greater than the first amplitude,
   the first source signal is used to capture a first point of the scene that is relatively close to the depth sensor, and
   the second source signal is used to capture a second point of the scene that is relatively far from the depth sensor.

2. The image capture method of claim 1, wherein a first object in the first image relatively far from the depth sensor is distorted, and a second object in the second image relatively close to the depth sensor is distorted.

3. The image capture method of claim 2, wherein:
   the first reflected signal is received by an array of depth pixels in the depth sensor; and
   the second reflected signal is received by the array of depth pixels in the depth sensor after receiving the first reflected signal.

4. The image capture method of claim 3, wherein receiving the first reflected signal comprises focusing the first reflected signal through a lens module, and
   receiving the second reflected signal comprises focusing the second reflected signal through the lens module after focusing the first reflected signal through the lens module.

5. The image capture method of claim 3, wherein each one of the depth pixels is one of a 1-tap depth pixel or a 2-tap depth pixel.

6. The image capture method of claim 5, wherein the depth sensor is part of a three-dimensional image sensor including at least one of a red pixel, a green pixel, and a blue pixel, a magenta pixel, a cyan pixel, and a yellow pixel.

7. The image capture method of claim 1, further comprising:
   storing image data corresponding to the final image in a memory;
   communicating the image data via an interface to a display; and
   generating a displayed image on the display in accordance with the image data.

8. A depth sensor comprising:
   a light source that emits a first source signal having a first amplitude towards a scene, and thereafter, emits a second source signal having a second amplitude different from the first amplitude towards the scene; and
   a depth pixel that generates a first reflected signal in response to a reflected portion of the first source signal, and thereafter, generates a second reflected signal in response to a reflected portion of the second source signal; and
   an image signal processor that:
   demodulates the first reflected signal with an N-times sampling operation to generate a first image,
   demodulates the second reflected signal with another N-times sampling operation to generate a second image, wherein N is an integer greater than one, and
   interpolates the first and second images to generate a final image, wherein:
   the second amplitude is greater than the first amplitude,
   the first source signal is used to capture a first point of the scene that is relatively close to the depth sensor, and
   the second source signal is used to capture a second point of the scene that is relatively far from the depth sensor.

9. The depth sensor of claim 8, wherein the light source is an infrared diode or a laser diode.

10. The depth sensor of claim 8, wherein a first object in the first image relatively far from the depth sensor is distorted, and a second object in the second image relatively close to the depth sensor is distorted.

11. The depth sensor of claim 8, further comprising:
a lens module that focuses the first reflected signal and the second reflected signal on the depth pixel; and
a correlated double sampling circuit operating with an analog-to-digital converter to convert the first reflected signal into first pixel signals and to convert the second reflected signal into second pixel signals.

12. The depth sensor of claim 8, wherein the depth pixel is one of a 1-tap depth pixel or a 2-tap depth pixel.

13. A three-dimensional (3D) sensor, comprising:
a light source that emits a first source signal having a first amplitude towards a scene, and thereafter, emits a second source signal having a second amplitude different from the first amplitude towards the scene;
a depth pixel configured to generate a first reflected signal in response to a reflected portion of the first source signal, and thereafter to generate a second reflected signal in response to a reflected portion of the second source signal; and
an image signal processor that:
demodulates the first reflected signal with an N-times sampling operation to generate a first image, demodulates the second reflected signal with another N-times sampling operation to generate a second image, wherein N is an integer greater than one, and interpolates the first and second images to generate a final image, wherein:
the second amplitude is greater than the first amplitude,
the first source signal is used to capture a first point of the scene that is relatively close to the 3D sensor, and
the second source signal is used to capture a second point of the scene that is relatively far from the 3D sensor.

14. The 3D sensor of claim 13, wherein the light source is an infrared diode or a laser diode.

15. The 3D sensor of claim 13, wherein a first object in the first image relatively far from the depth pixel is distorted, and a second object in the second image relatively close to the depth pixel is distorted.

16. The 3D sensor of claim 13, wherein the depth pixel is one of a 1-tap depth pixel or a 2-tap depth pixel.

17. The 3D sensor of claim 13, wherein the depth pixel comprises a red pixel, a green pixel, a blue pixel, a magenta pixel, a cyan pixel, or a yellow pixel.

* * * * *